No. 832,866. PATENTED OCT. 9, 1906.
A. M. LORENTZ.
MILK STRAINER.
APPLICATION FILED JULY 11, 1906.
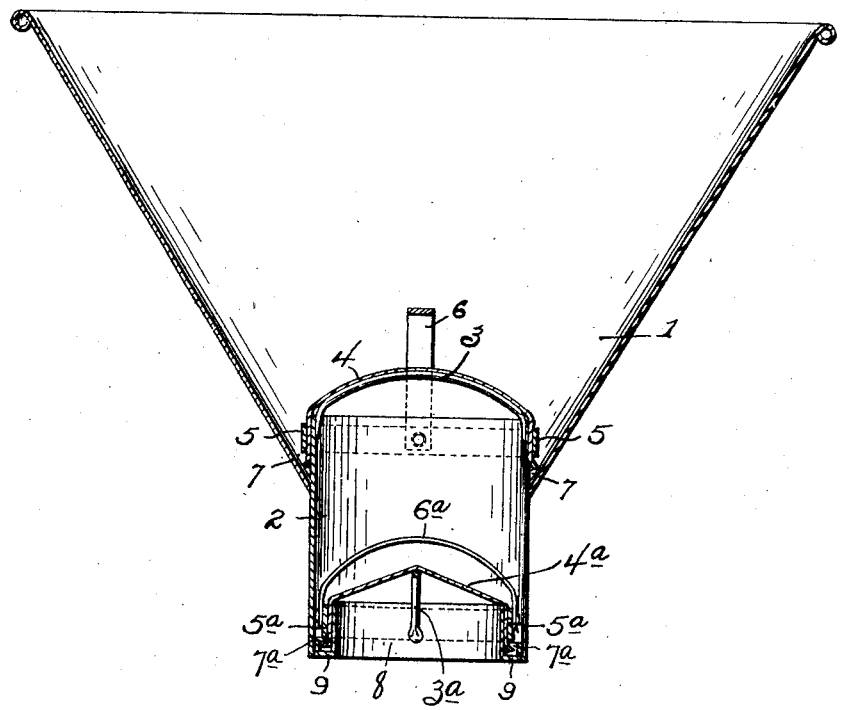
Witnesses
Robt F. Dilworth
Claud G. Matheney
Inventor
Albert M. Lorentz
H. E. Dunlap
Att'y

UNITED STATES PATENT OFFICE.

ALBERT M. LORENTZ, OF McMECHEN, WEST VIRGINIA.

MILK-STRAINER.

No. 832,866.

Specification of Letters Patent.

Patented Oct. 9, 1906.

Application filed July 11, 1906. Serial No. 325,679.

*To all whom it may concern:*

Be it known that I, ALBERT M. LORENTZ, a citizen of the United States of America, and a resident of McMechen, county of Marshall, and State of West Virginia, have invented certain new and useful Improvements in Milk-Strainers, of which the following is a specification.

My invention relates to new and useful improvements in milk-strainers, and more particularly to a sanitary milk-strainer of that class in which a cloth is used; and it consists in the particular construction, arrangement, and combination of parts, which will hereinafter be fully described.

The object of the invention is to provide a milk-strainer by means of which the milk is freed from particles of foreign matter and sediment which is carried in suspension thereby.

A further object is to provide a milk-strainer the construction of which is such that foreign matter or sediment contained by the milk is directed from the meshes of the strainer to a point where it remains during the straining process and is prevented from disintegrating and passing through with the milk.

In describing the invention in detail reference is herein had to the accompanying drawing, forming a part of this specification, in which the figure is a vertical section of the invention.

Referring to said drawing, 1 indicates a funnel-shaped receptacle, in the lower end of which is secured a cylinder or casing 2. The upper end of said casing projects upward within said receptacle a short distance above the lower end of the receptacle, as shown. Having its ends attached to the casing 2 at diametrically opposite points is a curved cross bar or wire 3 for supporting the strainer-cloth 4 in a semi-oval position when the latter is secured in place over the top of the casing by means of the clamping-ring 5. Said clamping-ring is provided with a handle 6, by means of which it is readily applied and removed.

As is obvious, milk poured into the receptacle 1 passes through the meshes of the strainer-cloth 4, which, being held by the wire 3, directs particles of foreign substance or insoluble matter contained by the milk from its substantially convex upper surface to the annular V-shaped space or channel 7, bounded by the upper end of the casing and the lower end of the receptacle, where the objectionable matter is held. The particles of matter which lie in said annular space or channel 7 are not acted on by the continual flow of the milk, as is the case when permitted to lie upon the surface of the strainer-cloth, and are therefore not subjected to the disintegration consequent to continued pouring of the milk upon or over said particles.

In practice I prefer to employ one or more additional straining devices in order to remove as nearly as practicable all objectionable matter from the milk. In constructing a strainer to provide such additional straining device a short cylinder or casing 8 is provided which has an annular horizontal flange 9 upon its lower end adapted for securing to the lower end of the cylinder or casing 2, as shown. Said cylinder or casing 8 is of less diameter than the casing 2, so as to form when secured in place an annular space or channel $7^a$, into which particles of foreign matter which may have passed through the strainer-cloth 4 will be directed by the curved surface of the strainer-cloth $4^a$. Said cloth $4^a$ is held in place by a clamping-ring $5^a$, having a handle $6^a$, and is held in a position presenting a substantially convex upper surface by a curved cross bar or wire $3^a$, as shown.

Obviously the strainer-cloth $4^a$ must be secured in position prior to securing the cloth 4 in position, the said cloth $4^a$ and clamping-ring $5^a$ being inserted from the top of the casing 2.

I have described the invention more or less in detail and in what I consider to be its simplest form; but it is obvious that various slight changes may be made in the construction and arrangement of some of the parts without departing from the general spirit or scope of the invention. Hence I do not wish to limit myself to the precise construction and arrangement of parts herein shown and described.

Having thus fully described my invention, what I claim as new, and desire to secure by Letters Patent, is—

1. In combination with a funnel-shaped receptacle, a casing secured to said receptacle and projecting thereinto forming an annular channel in conjunction therewith, an arcuate wire mounted upon said casing at its upper end, a strainer-cloth mounted over said wires, and a clamping-ring for securing said strainer-cloth in place, said clamping-ring having an arcuate handle, substantially as described.

2. In combination with a funnel-shaped receptacle, a casing secured to the receptacle and projecting thereinto, a strainer of convex form covering the inner end of said casing, a second casing within said first casing and spaced therefrom to form a channel in conjunction therewith, and a strainer of convex form covering the inner end of said second casing.

3. In combination with a receptacle, a casing secured to the receptacle and projecting thereinto, a second casing spaced from said first-named one and having an annular horizontal flange on its lower end secured to said first-named casing to form a channel in conjunction therewith, arcuate wires secured to the upper ends of each of said casings, a strainer-cloth engaging over each of said wires, and clamping-rings for securing said straining-cloths to said casings.

4. In combination with a funnel-shaped receptacle, a casing secured at an intermediate point along its length to the smaller end of said receptacle to form a channel in conjunction therewith, a convex straining element covering the inner end of said casing, a second casing within the first casing and spaced therefrom, a convex straining element covering the inner end of said second casing, and clamping-rings for securing said straining elements in place.

5. In combination with a funnel-shaped receptacle, a casing secured intermediate its ends in the lower end of said receptacle and having its upper end projected upward within said receptacle, a second casing within said first casing at its lower end and spaced therefrom to form a channel in conjunction therewith, arcuate wires secured to the upper ends of said casings, and straining elements mounted over said wires, said straining elements being supported by said wires and presenting convex upper faces adapted for directing insoluble matter therefrom.

Signed by me in the presence of two subscribing witnesses.

ALBERT M. LORENTZ.

Witnesses:
H. E. DUNLAP,
ROBT. F. DILWORTH.